O. R. YOUNG.
TUBE CUTTER.
APPLICATION FILED MAR. 19, 1909.
936,263.
Patented Oct. 5, 1909.
2 SHEETS—SHEET 2.
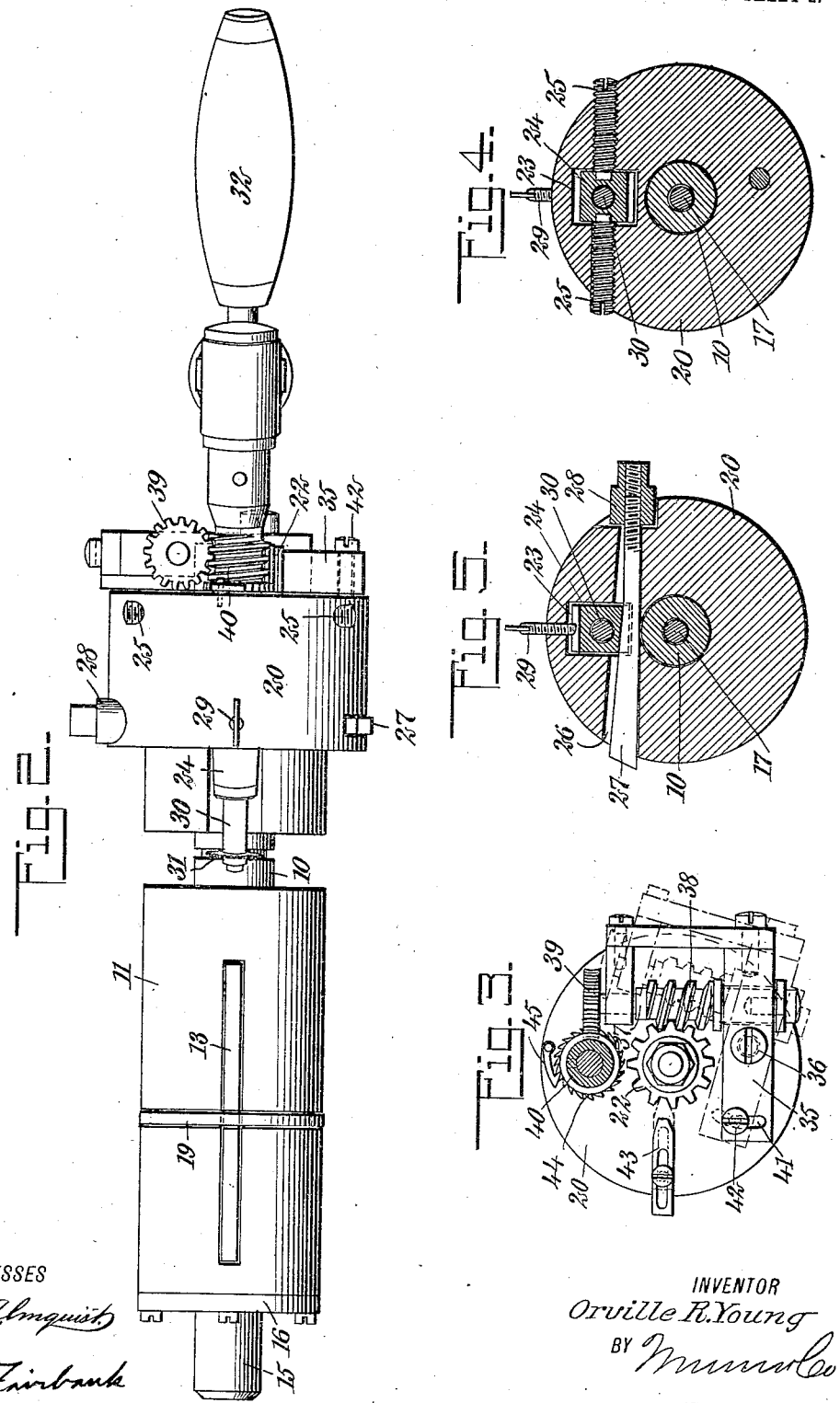
WITNESSES
L. Almquist
C. W. Fairbanks
INVENTOR
Orville R. Young
BY Munn&Co
ATTORNEYS

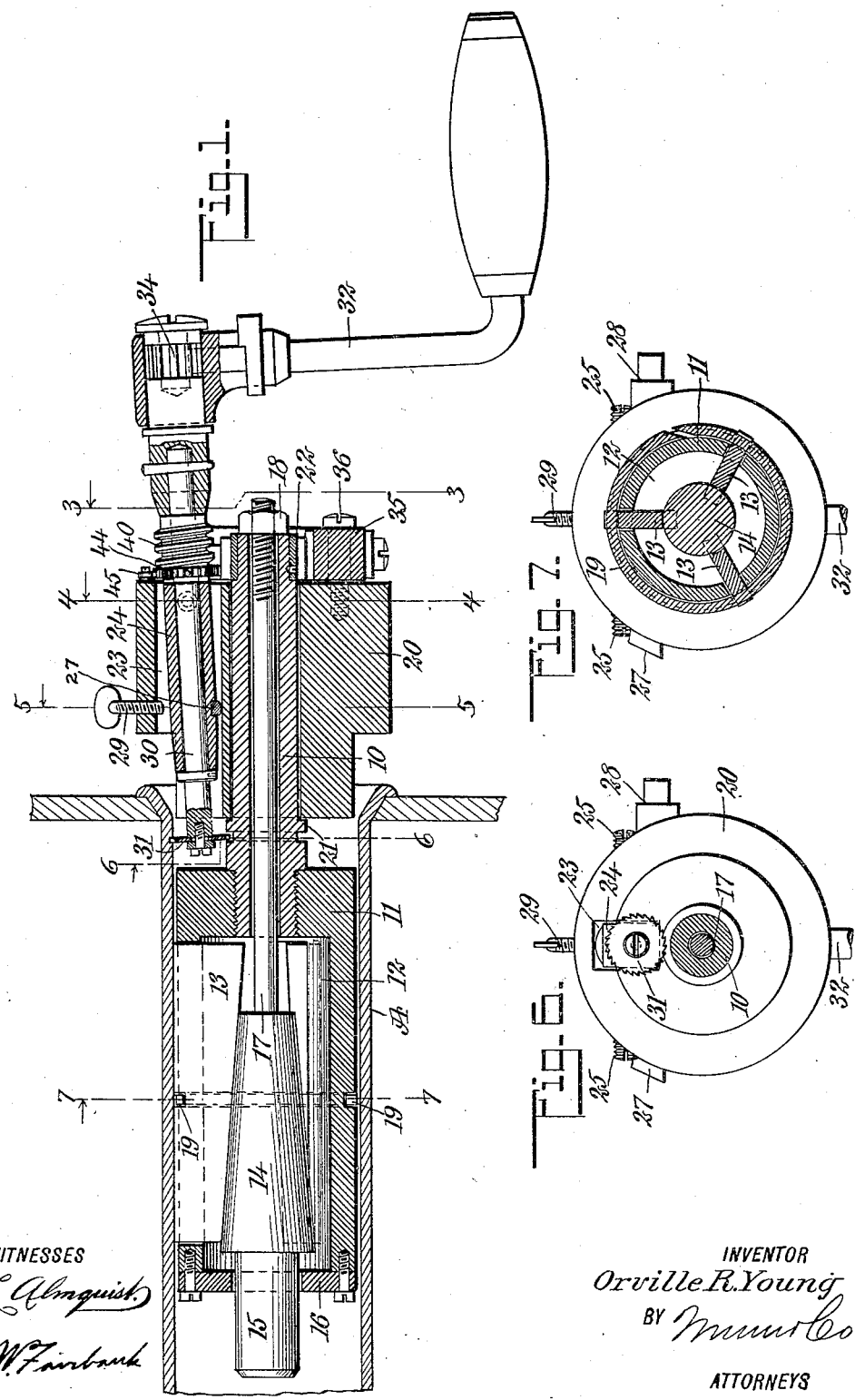

UNITED STATES PATENT OFFICE.

ORVILLE REEVE YOUNG, OF RIVERHEAD, NEW YORK.

TUBE-CUTTER.

936,263.  Specification of Letters Patent.  Patented Oct. 5, 1909.

Application filed March 19, 1909. Serial No. 484,432.

*To all whom it may concern:*

Be it known that I, ORVILLE REEVE YOUNG, a citizen of the United States, and a resident of Riverhead, in the county of Suffolk and State of New York, have invented a new and Improved Tube-Cutter, of which the following is a full, clear, and exact description.

This invention relates to certain improvements in tube cutters, and more particularly to that type of cutter which is adapted for insertion within the end of a tube and operates to saw or cut the tube in a plane at right angles to the length of the tube. Tube cutters of this character are useful for various different purposes, but they are particularly useful in facilitating the removal of defective tubes in a boiler or other similar tubular structure. In a boiler access cannot easily be had to the exterior of the tube and some difficulty is experienced in removing the tube unless it be cut in two from the interior.

Among the main advantages of my improved device over those heretofore employed, may be enumerated the facility with which it may be firmly clamped in place; the ease of adjustment; the automatic feed of the cutting tool around the interior of the tube; the control of the feed of the cutter outward radially, and the adaptability of the tool to use in places where the handle cannot turn through a complete circle. In my improved tool, the cutter may be rotated at any one point to cut entirely through that portion of the tube without being fed around circumferentially, or it may be automatically advanced circumferentially as fast as the metal is cut away.

Other features will be referred to hereinafter and particularly pointed out in the claims.

Reference is to be had to the accompanying drawings, forming a part of this specification, in which similar characters of reference indicate corresponding parts in all the figures, and in which—

Figure 1 is a longitudinal section through a tube cutter constructed in accordance with my invention and illustrated within the end of a boiler tube; Fig. 2 is an exterior view of my improved device, and taken at right angles to the plane of the section shown in Fig. 1; and Figs. 3, 4, 5, 6 and 7 are transverse sections on the lines 3—3, 4—4, 5—5, 6—6, and 7—7, respectively, of Fig. 1.

My improved tube cutter may be considered as being made up essentially of six separate parts or features, namely: a spindle, a clamping means for locking said spindle rigid in respect to a tube and concentric therewith, a head rotatable about the spindle, a rotary cutter, rotating means therefor, and feeding means for the cutter. The spindle 10 at one end, has threaded connections with an inner shell or clamp block 11, substantially cylindrical in form and of a diameter slightly less than that of the tube A which it is desired to cut. The clamp block 11 is formed with an interior chamber 12 and a plurality of slots through the outer wall thereof and extending lengthwise of the block. The clamp block carries a plurality of clamping members 13 disposed within the several slots and movable outwardly through the respective slots into engagement with the inner surface of the tube. These clamping members are preferably in the form of plates and they are each of greater width at one end than at the other. Within the chamber 12 I provide a conical block 14 in engagement with the inner edges of the several plates and movable longitudinally to force these plates outward radially. The cone is of its largest diameter at the end farthest from the spindle 10, and at this end is supported and guided by a cylindrical extension 15, which passes through a removable end plate 16 on the clamp block or casing. At its smaller end the cone is provided with a rod 17 extending centrally through the hollow spindle 10 to the outer end of the latter, and is there threaded and provided with a nut 18, by means of which the rod may be drawn longitudinally through the spindle.

When it is desired to clamp the tube cutter in position, the casing 11 of the clamp is inserted into the end of the tube to the desired extent, and by tightening the nut 18 the rod 17 is drawn outwardly through the spindle and the cone operated to force all of the clamping members 13 outward radially to exactly the same extent and into firm engagement with the inner surface of the tube, to positively lock the clamp block against any movement in respect to the tube. The clamping members may be normally held in their innermost position and prevented from accidental displacement or loss by a spring ring 19 disposed within a groove in the outer surface of the clamp block and passing through recesses in the outer edges of the several clamping members.

Rotatably mounted upon the spindle at its outer end is a head or block 20. As the clamping of the spindle in position is accomplished by means of the rod which comes through the interior of the spindle, it is evident that this clamping does not affect the free rotation of the block about the exterior of the spindle. The head is held against longitudinal movement on the spindle by means of a shoulder 21 for engagement with one end of the head, and a collar or gear wheel 22 at the outer end of the spindle for engagement with the other end of the head. The function of this gear wheel will be set forth more in detail hereinafter. The head is provided with an opening 23 extending therethrough substantially parallel to the central opening which receives the spindle, and through this opening 23 extends the means for rotating and radially feeding the cutter. A sleeve 24 extends through the opening 23 and at its outer end it is pivoted upon two set screws 25, 25, so that its inner end may swing radially toward and from the center of the head. The head is provided with a third opening 26 intersecting the longitudinal opening 23 at the inner side of the latter, and through said transverse opening 26 extends a cam block 27 which engages with the under side of the sleeve 24. At one end of the cam block is a nut 28 engaging with the shoulder on the side of the head and by means of which the cam block may be drawn longitudinally to force outwardly the inner end of the sleeve. A set screw 29 extends inwardly through the wall of the head into the opening 2, for limiting the outward movement of said sleeve. The sleeve serves to support a shaft 30, upon the inner end of which is a rotatable cutter or saw 31, and upon the outer end of which is secured a handle 32. By turning the handle, the shaft 30 and the cutter 31 are caused to rotate, and by loosening the set screw 29 and tightening the nut 28, the angle between the shaft 30 and the spindle 10 may be varied, so as to move the cutter outward radially into engagement with the inner surface of the tube. A further and continued loosening of the set screw 29 and tightening of the nut 28, feeds the saw outward radially as it cuts into the metal of the tube.

The handle 32 may be of any suitable character, but is preferably connected to the outer end of the shaft by suitable ratchet connections 34, common in the art of bits, augers, screw-drivers and the like, and by means of which the shaft and cutter may be continuously rotated in one direction by an oscillation of the handle. I have not shown these ratchet connections in detail, as they in themselves constitute no portion of my invention.

For preventing the cutter from rotating in any except one direction during the oscillation of the handle 32, the shaft 30 may be provided with a ratchet wheel 44 coacting with a dog 45 pivotally mounted on the end of the head.

For automatically feeding the cutter circumferentially around the inner surface of the tube, so as to cut an annular groove of uniform depth in the tube and continue deepening the cut until the tube is completely severed, I provide the feed mechanism shown particularly in Fig. 3. Pivotally connected to the outer end of the head is a frame 35 secured by a set screw 36 constituting a pivot, and within this frame is carried a short shaft 37 having a worm 38 and a worm wheel 39. The worm 38 intermeshes with the gear wheel or worm wheel 22, mounted on the spindle as previously referred to, and the worm wheel 39 engages with a worm 40 mounted on the shaft 30 of the cutter. Thus as the shaft 30 is rotated to rotate the cutter, motion is transmitted through the train of gears 40, 39, 38 and 22, to the spindle. As the spindle is held against rotation, it is evident that the worm 38 will be caused to travel around the gear 22 and thus cause the head to slowly rotate about the spindle. The speed of rotation in respect to the speed of the cutter may be varied by varying the pitch and size of the gears.

In starting the device in operation, it is desirable to prevent the rotation of the head about the spindle, so that the cutter may continue to rotate in one particular point. For permitting this, I provide the frame 35 with a slot 41 and a set screw 42, whereby upon loosening the set screw, the frame may be turned about the pivot 36 to move the worm wheel 39 out of engagement with the worm 40. This permits the rotation of the shaft independently of the head. A slide 43 is mounted on the head and movable radially into engagement with the gear 22, so as to positively prevent rotation of the head in respect to the spindle. This slide is normally held in the position indicated in Fig. 3, but is provided with a slot-and-screw connection with the head, so that by loosening the screw the slide may be moved longitudinally into operative position and there locked against return movement.

By means of my improved tool, it will be noted that the saw may be either operated at one particular point about the periphery of the tube, or may be automatically fed around the entire periphery, and that the saw may be fed outward radially as fast as the material forming the tube is cut away. The device may be clamped in position at varying distances from the end of the tube, so that the position of the cutter may be varied, and the saw may be continuously rotated in one direction even though the handle 32 cannot complete a full swing. In removing a tube from a boiler, the device may be inserted in the end of the boiler tube and operated to sever the tube just inside of the expanded end of the latter, so that the two parts of the tube may be pulled out through the crown sheets in opposite directions.

Having thus described my invention, I claim as new and desire to secure by Letters Patent:

1. A tube cutter including a spindle, means for engaging with the tube to be cut to support the spindle and hold it concentric with the tube, a rotatable head carried by said spindle, a cutter supported by the head and adapted to be disposed within the tube, means for rotating said cutter, means for moving said cutter outward radially in respect to the tube, and means for moving said cutter circumferentially along the inner surface of the tube.

2. A tube cutter including a spindle, means adapted to extend into the tube to be cut to hold the spindle concentric therewith, a rotatable head carried by said spindle, a cutter supported by the head and adapted to be disposed within the tube, means for rotating said cutter, and means for moving said cutter outward radially in respect to the tube.

3. A tube cutter including a spindle, means for supporting said spindle from the tube to be cut and holding the two concentric, a rotatable head carried by said spindle, a cutter carried by the head and adapted to be disposed within the tube, means for rotating said cutter, and means for moving said cutter circumferentially along the inner surface of the tube.

4. A portable tube cutter including a spindle, means for supporting said spindle from the tube to be cut, a rotatable head carried by said spindle, a cutter carried by the head and adapted to be disposed within the tube, and means for rotating said cutter.

5. A portable tube cutter including a rotatable head, means for engaging with the tube to be cut to support said head, a cutter carried by the head and adapted to be disposed within the tube, means for moving said cutter outward radially in respect to the tube, and means for moving said cutter circumferentially along the inner surface of the tube.

6. A tube cutter, comprising a spindle, a clamping block secured thereto and adapted to fit within a tube, clamping members carried by said clamping block, a conical operating member for engaging with said clamping members, means at the outer end of the spindle for moving said operating member into position to clamp the spindle rigid in respect to the tube, and means carried by said spindle for engagement with the inner surface of the tube to cut the latter.

7. A portable tube cutter, including a spindle having means for rigidly connecting it with the tube to be cut and concentric in respect thereto, a head carried by said spindle, a sleeve pivotally connected to said head to move in a radial plane, a shaft extending through said sleeve, and a cutter carried by said shaft for operative engagement with the inner surface of the tube.

8. A portable tube cutter, including a spindle having means for rigidly connecting it with the tube to be cut and concentric in respect thereto, a head carried by said spindle, a sleeve pivotally connected to said head to move in a radial plane, a shaft extending through said sleeve, a cutter carried by said shaft for operative engagement with the inner surface of the tube, and means for swinging said sleeve to move the cutter radially in respect to the tube.

9. A portable tube cutter, including a spindle having means for rigidly connecting it to the tube to be cut, a head rotatably mounted upon said spindle, a shaft carried by said head, a cutter carried by said shaft, and means for rotating said shaft and head simultaneously.

10. A portable tube cutter, including a spindle having means for rigidly connecting it with a tube to be cut, a shaft rotatable about its own axis and carried by said spindle and movable around the same, a cutter secured to said shaft, means for rotating said shaft, and gearing connecting said shaft and said spindle for insuring the simultaneous rotation of said head and shaft at different speeds.

11. A tube cutter, including a rotary shaft adapted to extend into the end of the tube, a cutter secured to the end of the shaft, means for engaging with the tube to support said shaft, means for rotating said shaft, and means for moving said shaft laterally to advance the cutter along the inner surface of the tube circumferentially upon the rotation of said cutter.

12. A tube cutter, including a spindle adapted to extend into the tube to be cut, means carried by said spindle and adapted to expand into engagement with the tube to hold the spindle rigid in respect to the latter, and means movable around the spindle for engaging with the inner surface of the tube to cut the latter.

In testimony whereof I have signed my name to this specification in the presence of two subscribing witnesses.

ORVILLE REEVE YOUNG.

Witnesses:
  CORA B. REEVE,
  ELLIS S. DUVALL.